(12) United States Patent
Cook

(10) Patent No.: US 9,255,506 B2
(45) Date of Patent: Feb. 9, 2016

(54) LOCOMOTIVE NATURAL GAS STORAGE AND TRANSFER SYSTEM

(71) Applicant: David Cook, Fullerton, CA (US)

(72) Inventor: David Cook, Fullerton, CA (US)

(73) Assignee: Rail Gas Technologies, Glendora, CA (US)

( * ) Notice: Subject to any disclaimer, the term of this patent is extended or adjusted under 35 U.S.C. 154(b) by 15 days.

(21) Appl. No.: 14/216,992

(22) Filed: Mar. 17, 2014

(65) Prior Publication Data

US 2014/0261073 A1 Sep. 18, 2014

Related U.S. Application Data

(60) Provisional application No. 61/790,771, filed on Mar. 15, 2013.

(51) Int. Cl.
| | |
|---|---|
| *B61C 17/02* | (2006.01) |
| *B61D 15/06* | (2006.01) |
| *F01N 3/20* | (2006.01) |
| *B61C 3/02* | (2006.01) |
| *F01N 3/10* | (2006.01) |
| *F01N 13/08* | (2010.01) |
| *F01N 13/10* | (2010.01) |
| *F01N 13/18* | (2010.01) |
| *F01N 13/00* | (2010.01) |

(52) U.S. Cl.
CPC ... *F01N 3/20* (2013.01); *B61C 3/02* (2013.01); *B61C 17/02* (2013.01); *B61D 15/06* (2013.01); *F01N 3/103* (2013.01); *F01N 3/2066* (2013.01); *F01N 13/0093* (2014.06); *F01N 13/085* (2013.01); *F01N 13/10* (2013.01); *F01N 13/1816* (2013.01); *F01N 2340/02* (2013.01); *F01N 2340/06* (2013.01); *Y02T 10/24* (2013.01); *Y02T 30/12* (2013.01)

(58) Field of Classification Search
CPC .................. F17C 2201/035; F17C 2201/0109; F17C 2223/0123; F17C 2205/0107; F17C 2205/0142; F17C 2270/0171; F17C 2201/054; F17C 2221/033; F17C 2205/013; F17C 2223/036; F17C 13/083; F17C 13/085; B61C 17/02; B61D 15/06
USPC .......... 105/392.5, 394, 360; 312/72; 211/194, 211/85.18, 74; 410/42, 49, 32, 36, 47; 220/1.5; 280/837
See application file for complete search history.

(56) References Cited

U.S. PATENT DOCUMENTS

| 6,135,297 | A | * | 10/2000 | DeShazo et al. | ................. | 211/74 |
| 2002/0113528 | A1 | * | 8/2002 | Van Daalwyk | ................. | 312/72 |

* cited by examiner

*Primary Examiner* — Mark Le
(74) *Attorney, Agent, or Firm* — Richards Patent Law P.C.

(57) ABSTRACT

A locomotive underframe CNG fuel storage system including: a crashworthy enclosure including a removable side panel and a permanent side panel welded into place; and at least one CNG cylinder module, wherein each CNG cylinder module includes a plurality of CNG cylinders stacked vertically, secured to a vertical wall, and separated by a horizontal plate, wherein the horizontal plate extends towards but does not contact the vertical wall when the vertical wall is planar and, further wherein, the horizontal plate supports the vertical wall from moving further out of plane when vertical axial weight causes the vertical wall for move out of plane towards the horizontal plate.

13 Claims, 14 Drawing Sheets

Detail A

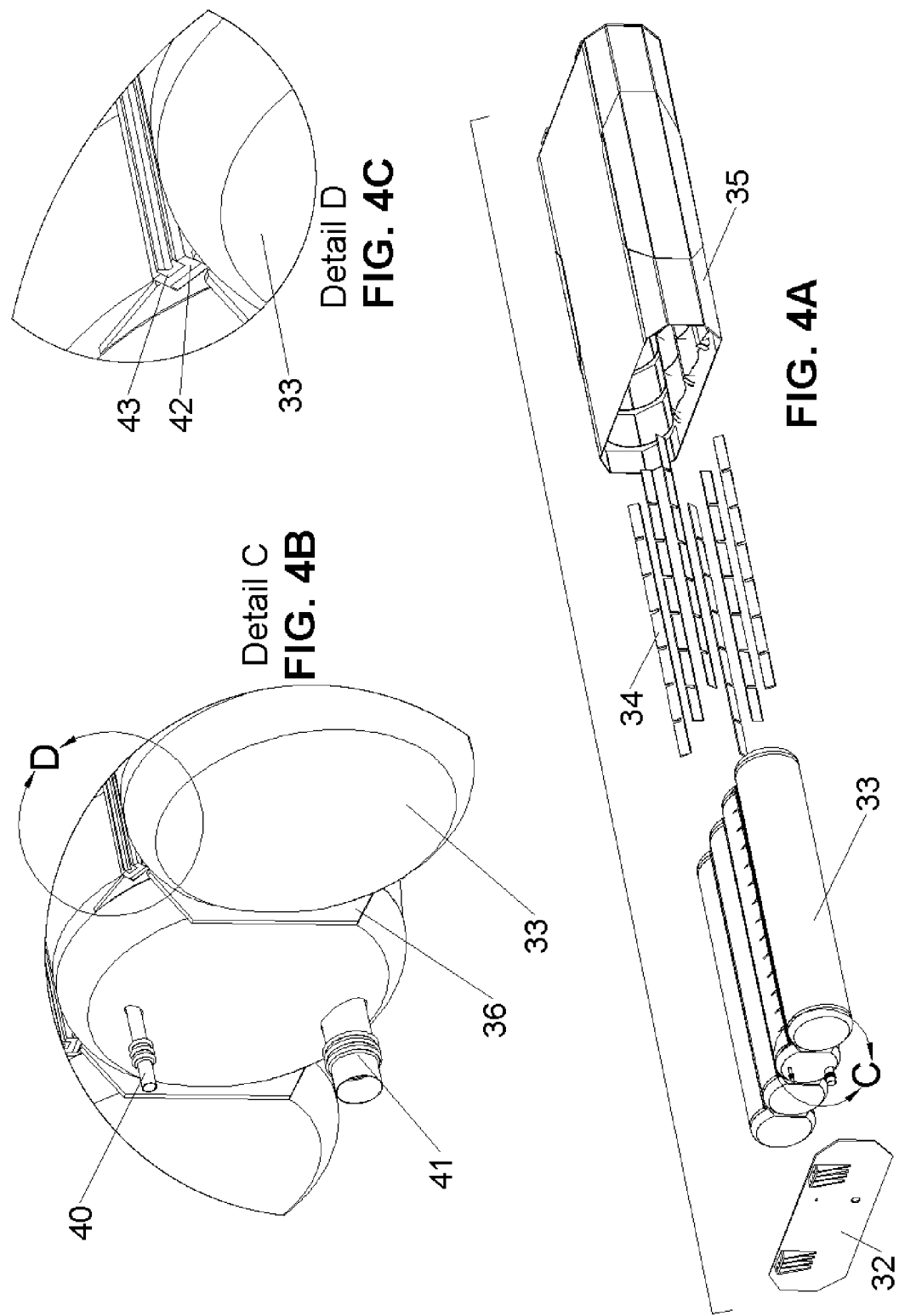

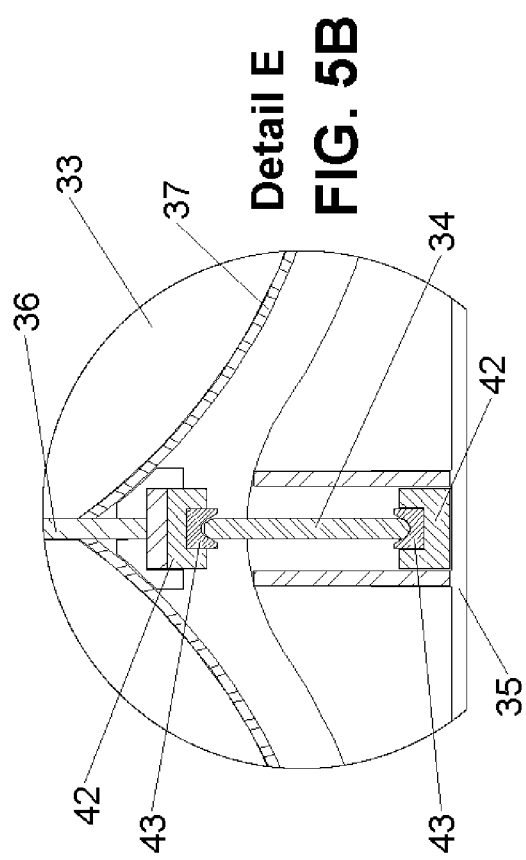
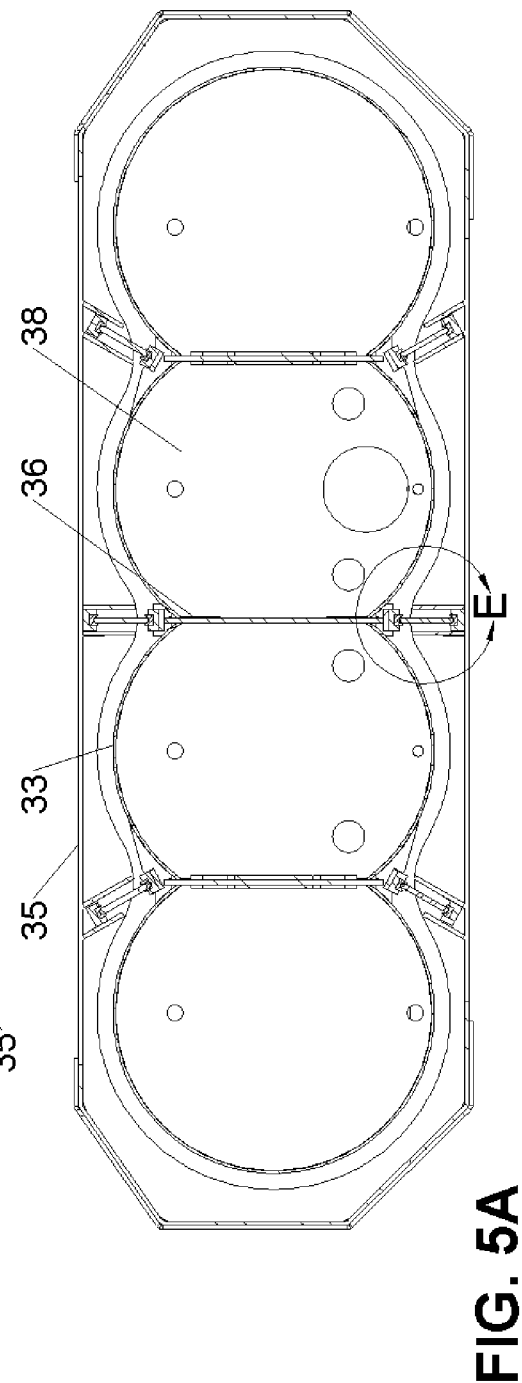
Detail E
FIG. 5B
FIG. 5A

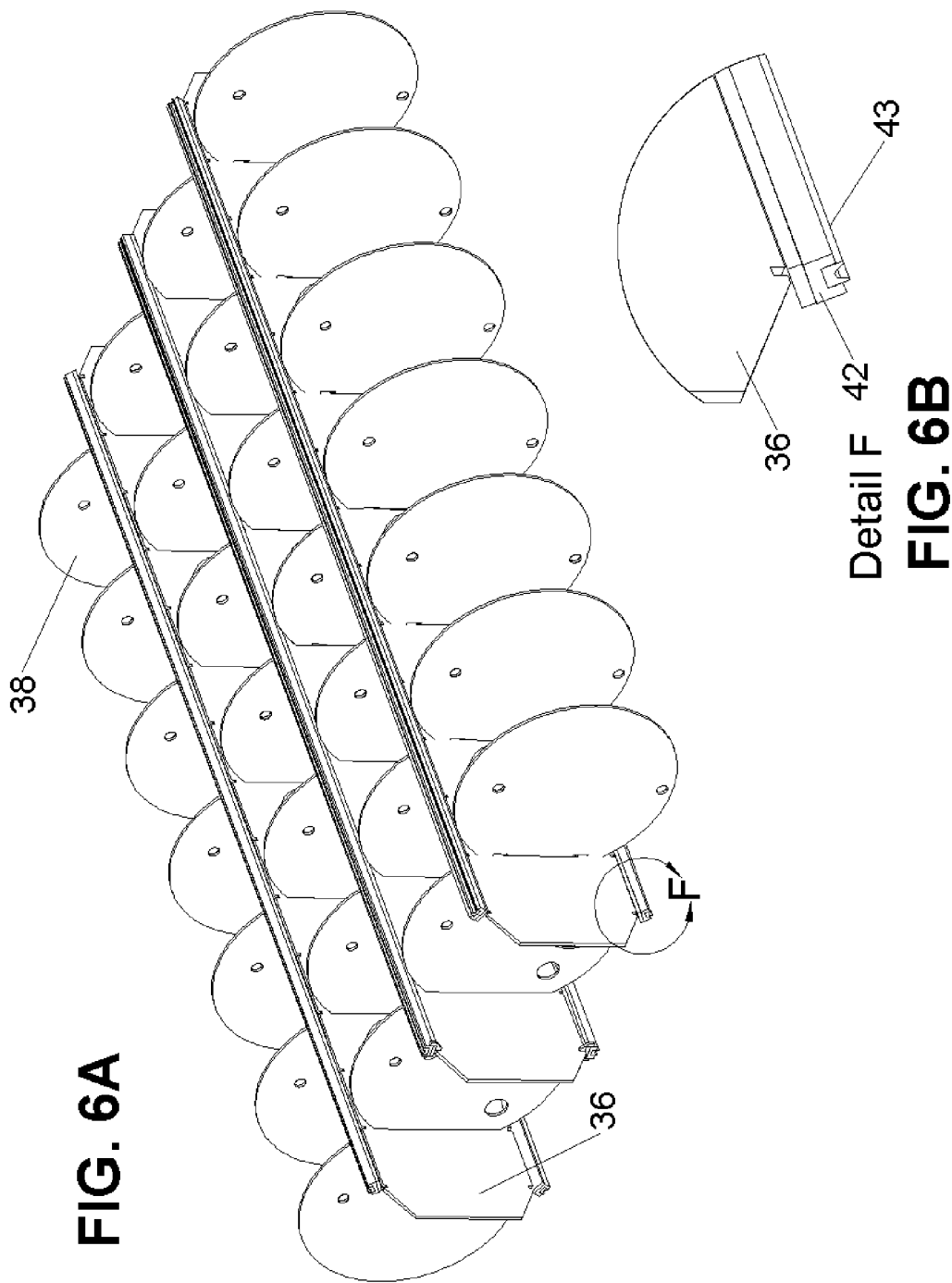

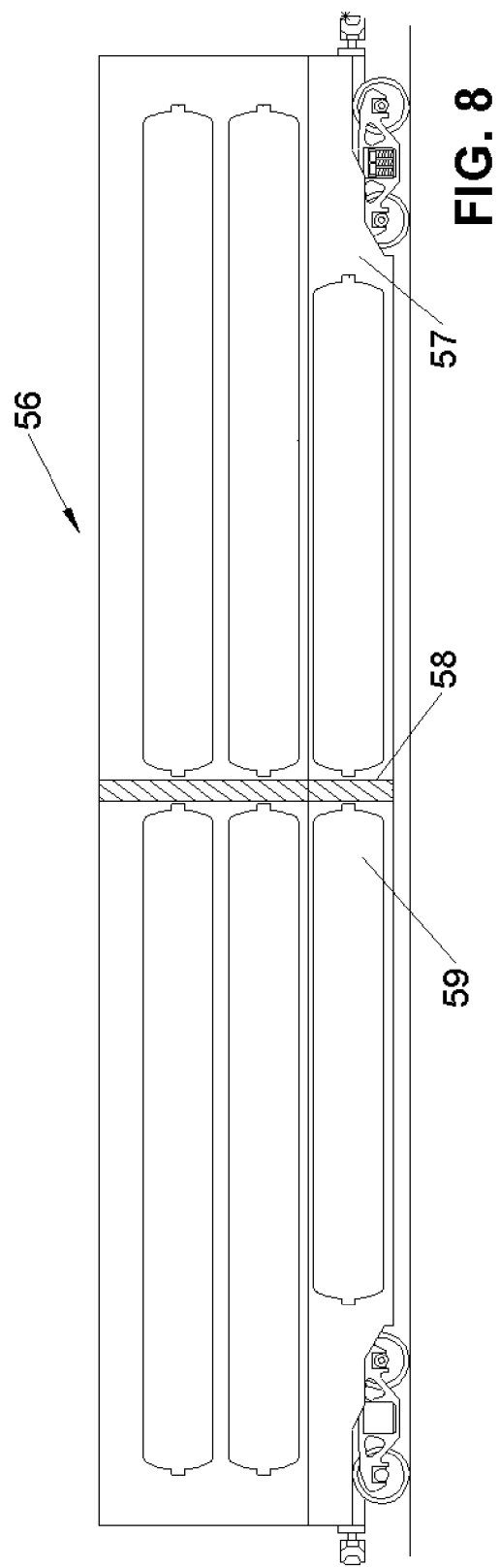

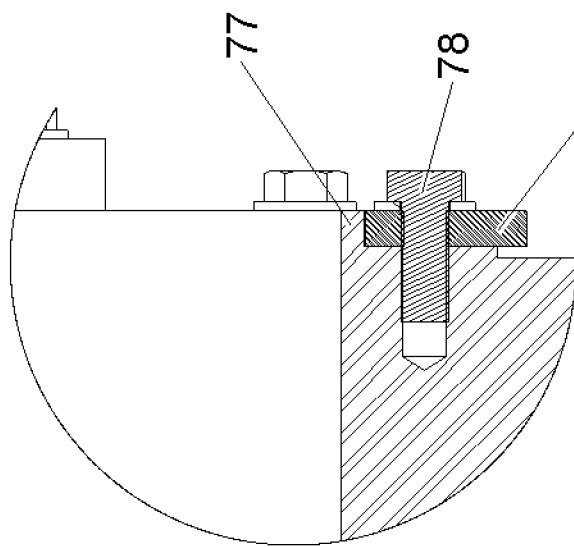
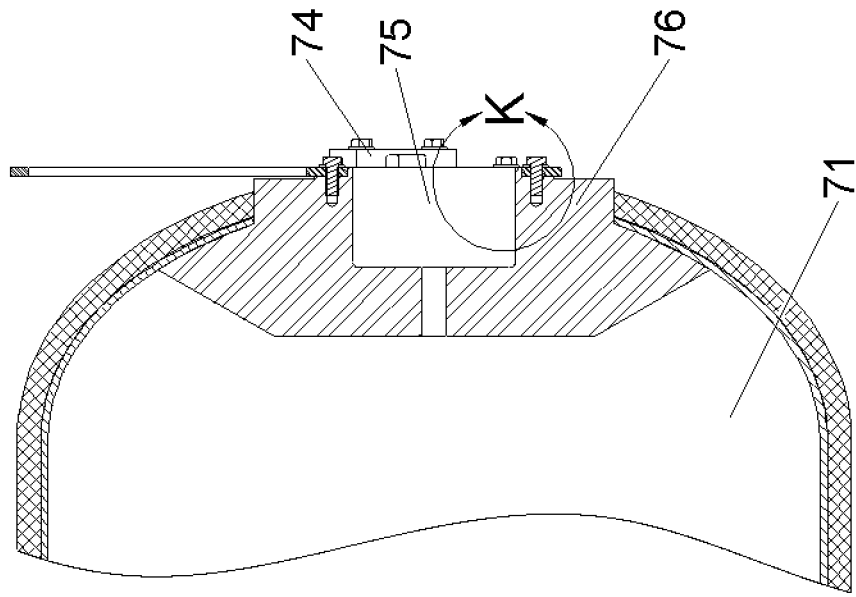

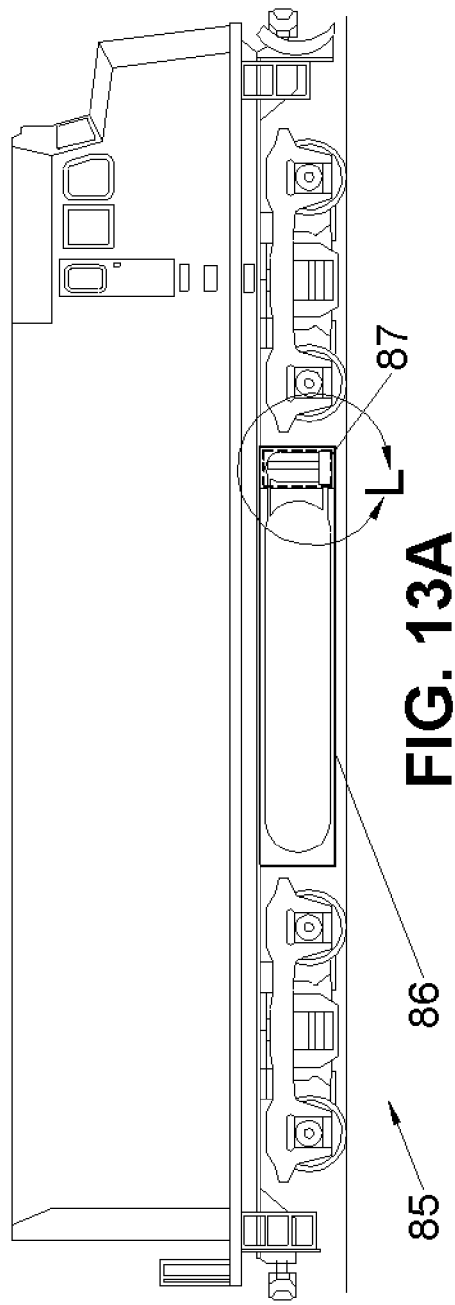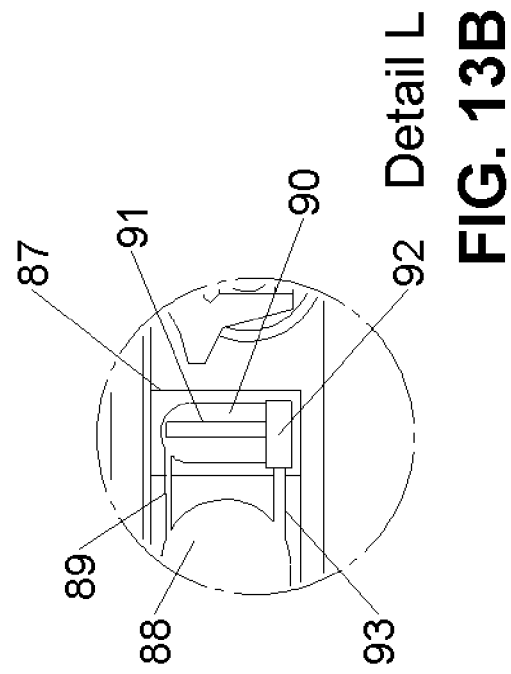

LOCOMOTIVE NATURAL GAS STORAGE AND TRANSFER SYSTEM

CROSS-REFERENCE TO RELATED APPLICATIONS

This application claims the benefit of U.S. Provisional Application No. 61/790,771 filed on Mar. 15, 2013, the entirety of which is incorporated herein by reference.

BACKGROUND OF THE INVENTION

Current state of the art for storage and transfer of natural gas (NG) to engines used in mobile off road applications consist primarily of commonly available components and existing technology configured for demonstration. The storage tanks and support equipment used in existing systems are repurposed from other industries in commercially available sizes and configurations that are less than ideal for high horsepower, mobile applications. For locomotive applications, these systems are made up of dedicated NG tender cars, or standard tanks mounted on flat railcars or fixed underframe between the trucks.

As a result, existing systems for locomotives, both CNG and LNG have been limited to specific local application and pilot or research projects that do not necessarily require large storage capacity, ease of service, maintainability or adherence to regulations such as crash worthiness necessary for general use on freight and passenger lines. In off road mobile applications, the most significant technical challenge is attaining the necessary DGE capacity to motivate manufacturers and end users to convert from diesel fuel. In packaging of the NG tanks to attain a sufficiently high storage capacity and required crashworthiness, it is still important that the system still be simple, reliable and easy to maintain. Further this should be done with minimal or no perceived impact to the end user.

For tenders and flat cars, it is possible to attain acceptable storage capacity, but results in additional rail cars to the train consist and/or added weight and complexity for the operators to deal with. Tanker cars or tanks on flat beds must be modified by adding structure and reinforcement necessary in order to make them meet safety and crashworthiness requirements for tender car use. For underframe storage, these existing components and packaging schemes limit the storage density, thus limiting the range, performance and functionality of the vehicle the system is supporting. Underframe or belly mounted tanks in place of or in addition to the existing fuel tanks on the locomotive present greater challenges in package and storage capacity as well as introducing additional requirements for crash worthiness criteria and other safety regulations. Current underframe NG storage systems have been limited to 200 DGE (diesel gallon equivalent). In order for natural gas fueled solutions to be commercially viable for locomotives, 600 DGE or more must be attained. Prior locomotive tank systems such as the CNG system on the Napa Valley Wine train have conventional type 1 steel tanks installed under frame longitudinally on the locomotive along the axis of train motion. This approach makes mounting and servicing the tanks less than ideal as it requires removing the enclosure with all the tanks at once as one assembly. Another downside of this type of longitudinal tank arrangement is its lack of storage density when the longitudinal space to put the tanks in is less than 9 feet as it is with typical switcher locomotives. This results in a higher quantity of shorter tanks, reducing the storage capacity and increasing the cost as well as the number of components and potential leak points.

For both tender car and underframe NG storage, maximizing capacity requires close spacing of the NG cylinders making mounting the tanks in tender cars or under frame enclosures a challenge. There are currently two common methods of mounting NG cylinders, strap mounting with two steel straps wrapped around the outer diameter of the tank, or neck mounting with block mounts capturing a large pin at each end of the tank. In strap mounting, rubber isolator strips are placed between the mount straps and the surface of the tank to both prevent damage to the outer composite skin, and to allow the tanks to grow slightly in length and diameter when they are filled. In pin mounting, one end of the tank is fixed into position to prevent rotation, while the other end has a loose fitting mount block which allows the pin to slide axially as the tank grows in length during filling.

The most common application of CNG cylinders such as these are municipal transit buses. In transit buses the tanks are slightly shorter than proposed laterally mounted locomotive tanks and they are typically neck mounted. Neck mounting would appear to offer the easiest mounting in the tight locomotive enclosure, but there are distinct and important differences between the switcher duty cycle and the transit bus cycle. The switcher has metal on metal wheels and will see significantly more vertical vibration, this will affect the loose fit in the sliding pin block causing degradation of the pin material where it meets the block, as the locomotive CNG tank is longer and heavier it could also cause fatigue in the aluminum neck boss material and a tank failure at the tank neck. Another important factor is the life cycle; buses are in service typically 10 to 12 years, whereas 50 year old switchers are still being rebuilt today. The most significant detriment to the neck mounting system is the operation of the switcher locomotive, its primary purpose is to frequently couple and uncouple with rail cars, and these coupling events lead to repeated impulse loads of several g's. These repeated impulses could be a fatigue risk to conventional neck mounted composite CNG cylinders if the loads are significant and perpendicular to the axis of the tank.

Strap mounting of the CNG cylinders would overcome this impulse loading issue. The issue with strap mounting of CNG cylinders is that access is needed to tighten the straps from the side and this will require spacing the tanks further apart thus reducing the total number of CNG cylinders and total fuel capacity.

As natural gas has been introduced as a fuel for the railroad industry there has been a focus on using Liquefied natural gas (LNG) as the storage medium for increased range over using compressed natural gas (CNG). LNG was also considered the best fuel storage system for transit buses when natural gas was first used for that application. Most of the original LNG transit buses have since been replaced by CNG as the technology of the CNG tanks has improved. LNG currently has many disadvantages over CNG. LNG plants have to be built very large to economically make LNG, up until 2012 there were only 3 LNG plants constructed specifically to make LNG for transportation use. LNG tanks absorb heat from the outside and if the tanks are left to sit they will vent methane gas. This becomes a problem when an agency has several hundred busses with some of them idle. Also as LNG is stored for a long period of time and is venting, its percentage of methane will drop over time as methane boils off first. This effect is called weathering and as the fuel weathers its octane rating decreases as the percentage of methane decreases and its percentage of lower octane propane, butane and other 'thanes' increases. Using fuel that has weathered too long can result in engine damage.

Current mobile LNG storage and delivery systems for natural gas fueled engines are passive and controlled by regulating the vaporization of the LNG to CNG at the necessary pressure for the fuel system application it is supporting. Using this approach, the LNG in the tank is maintained at or near the vaporization temperature for the natural gas at the required supply pressure either by removing LNG from the tank to cool and lower the pressure or heating the tank externally to allow more vaporization to raise the pressure. The vaporization based systems are typically designed to operate at approximately 125 psi and must maintain a specific temperature range of −130 +/−10 degrees Celsius in order to provide sufficient fuel pressure to the engines fuel management system. As a result, using the vaporization point of the natural gas to control fuel delivery is a proven concept but it reduces the amount of LNG that can be stored in a given tank, the pressure it is supplied at, and the time that it can be maintained in liquid state within the fixed volume of the tank before it vaporizes and must be purged. Further this system requires heat to be added to the tank to raise the pressure or off gassing or flaring of vaporized natural gas if it is not consumed in time by the engine, both of which expend energy or release fuel which further reduced range and efficiency In order to refuel a system like this, the filling equipment typically saturates the fuel by adding heat. If a vehicle is not filled with saturated fuel, it may take a significant amount of time to raise the equalized saturation temperature and pressure in the tank so that the vehicle engine can be operated at full power. This is especially a problem when refueling large pieces of offload equipment from LNG tanker trucks.

A further challenge in passive LNG tank systems is maintaining the required tank pressure when the engine is at high loads and consuming a large amount of fuel over an extended time. When LNG fuel is withdrawn from the tank, a small amount of the remaining LNG will boil off to bring the tank pressure back to equilibrium. When this small amount of fuel boils off, it absorbs a large amount of latent heat and chills the remaining liquid. This was a particular problem with the LNG switchers at LA Junction RR, the locomotives could only operate at high power for a short time before low LNG tank pressure forced the system to reduce engine power output.

BRIEF SUMMARY OF THE INVENTION

The proposed invention is an integrated on vehicle natural gas storage and transfer system (CNG or LNG) that maximizes storage capacity, minimizes space claim and structure weight, and incorporates specific features to meet or exceed the industry performance, safety and functional requirements for general rail use. The system is modular and adaptable for under frame or tender car storage applications consisting of mounting frames or enclosures and tank modules that are contained within them. The frames and enclosures are specifically designed for tender car or underframe mounting and can support commercially available cylinders and tanks or specially developed tank modules. The tank modules are removable, serviceable units fitted with optimized cylinders or tanks allowing ideal integration solutions for CNG or LNG storage.

The first portion of the summary relates to a locomotive underframe CNG fuel storage system. In order to encourage the conversion of locomotives to natural gas as a fuel, customers will need enough fuel storage capacity to accomplish the needed work with minimal changes to current operations and refueling schedules. At the same time that high fuel storage capacity is important, the system must be economical to purchase, meet crashworthy requirements and be easy to maintain.

There are two main components to the Locomotive Underframe CNG Fuel storage System. There is the main crashworthy enclosure, and the required one or more CNG cylinder modules The under frame enclosure is a hardened encasement for the tanks modules to be contained within. The enclosure is built as an armored box capable of absorbing both the side impact of a class 8 truck and support the weight of the locomotive if it were to derail and land on the steel rail supporting the locomotive weight on the fuel tank bottom. At the same time this enclosure has to be protective, it also has to allow the tanks inside it to be serviceable. The ideal packaging of tank cylinders is laterally in order to make the cylinders and plumbing accessible and serviceable.

Configuring the tanks or tank modules laterally in the enclosure allows the tanks to be inserted and removed from the side via a removable protective panel. This also allows servicing of the tank plumbing and valves from the side of the locomotive. The tanks or tank modules can be removed individually without removing the entire enclosure from the chassis. This is important as the tank cylinders pressure vessels that are likely going to need removal for periodic hydro static requalification testing at every 4 year locomotive maintenance cycle.

The enclosure is scalable to work with various widths, heights and lengths allowing the use of tanks in various sizes and types from off the shelf 16" diameter 3600 psi type 3 tanks such as those made by Structural Composites Inc, to custom tanks with specific geometric or performance features such as Siamese LNG tanks that further increase total NG storage capacity. For example, a 2-pack CNG tank module using 3600 psi type 3 tanks of 85" and 105" standard length respectively would hold approximately 36 diesel gallon equivalent (DGE) of CNG. With higher pressure 4500 psi tanks made to specific lengths (101" and 110") to fit this enclosure, each 2-pack of tanks would then hold 33% more CNG, ~50 DGE, in the same amount of space.

The second portion of the summary relates to a CNG tank module. For the under frame NG storage within the enclosure, the most efficient packaging for the tanks is a multi-cylinder tank module. The tank modules can be sized, stacked, or joined in a package to fit within a specific enclosure or mounting frame. The enclosure or mounting frame is scalable and sized to accept one or more tank modules. The tank modules are standalone, removable, serviceable, replaceable and can be mounted alone or in multiples contained within an enclosure. The module concept optimizes tank integration and configuration to maximize available storage volume.

For CNG applications, the tank module(s) are integrated into the underframe enclosure. In a typical switcher there is approximately 7 feet of space between the axle trucks so longitudinal tanks would be shorter than 7 feet. When tanks are stored laterally in a switcher, they are both longer and removable from the side. If the switcher tanks had been installed longitudinally there would have been 11 tanks and they would have been 7 feet long. A typical SW 1500 switcher would use an enclosure module with 4 or 5 two pack tank modules oriented laterally as previously described resulting in up to 250 DGE of CNG on board the switcher.

The novelty of the integrated design of the CNG tank module and the enclosure allows the physical presence of the CNG cylinders to structurally enhance the enclosures ability to absorb vertical crushing loads during locomotive derailment events. This is done by having some part of the CNG cylinder module prevent the lateral motion of the vertical walls of the enclosure when they attempt to buckle. It only takes a small lateral force to keep the wall from buckling, this lateral force could be $1/100^{th}$ the vertical force trying to crush the structure. If the module did not serve this function, the vertical walls would need to be much thicker and heavier increase the enclosure cost and weight while reducing the room for additional CNG cylinder modules.

The third portion of the summary relates to a CNG tender car frame. What is proposed is using these cylinders in a novel configuration to maximize the amount of CNG storage in a railroad fuel tender car while increasing the safety of the design. By splitting the car with a structural bulkhead, it makes the tender car able to sustain side impact collisions better at railroad crossings. This is because the structural bulkhead will solidly tie the two sides of the rail car together.

This sectioning of the car also allows the CNG cylinders for a 76' long car to be made by existing companies such as Lincoln Composites on their existing tooling as the longest tank in the car will be 33 feet long which is shorter than their current 38 foot standard Titan tank. It is practical for a manufacturer to make shorter tanks on existing tooling, but longer tanks would require newer tooling and possibly a newer process.

The fourth portion of the summary relates to an intermodal well car based LNG tender tank module. If an ISO Tank module is going to be used in an intermodal well car as a locomotive fuel tender, there will be an issue with side impact protection from vehicles at crossings. The well car has thin side walls to fit through tunnels and it has to surround a box at least 40' long and up to 53' long. This long thin wall will collapse easily if struck from the side by a vehicle at railroad crossings.

A simple solution to this issue is to incorporate a structural bulkhead into the ISO container that connects the ISO mount frame to the outer pressure vessel wall of the tank. By connecting to the outer wall of the pressure vessel, the circular tank material acts in a similar manner to a bridge arch and forms a very strong structural element for absorbing loads acting in the plane of the bulkhead. In a side impact, the wall of the well car will still collapse somewhat, but it will then contact this bulkhead which is connected to the opposing wall of the enclosure module. In order for the first wall to continue collapsing, the entire ISO module must start to bend if the structural bulkhead wall does not itself collapse.

The fifth portion of the summary relates to plate mounting of large type 4 CNG cylinders. Proposed here is a plate mounting system to replace both the pin and the strap mounting systems common to type 3 and type 4 CNG cylinders.

For the locomotive application this solves the issue of trying to use mounting straps in the very close confines of a tight fitting crashworthy enclosure. It also eliminates all the issues with the use of pin mounting in rail applications.

The large mounting pilot close to the surface of the CNG cylinder shell eliminates what would be a large torque load on the CNG cylinder end pin during coupling loads or a train collision. Also the larger pilot allows for a central cavity on the cylinder cap to be used to recess the valves and fittings so that the cylinders are more crash worthy and allow addition circumferential volume at the end of the tank for higher fuel storage capacity.

The pilot also eliminates an issue of pin and pocket wear from the slip fit, this is an issue on locomotives due to the steel wheel on rail vibration and long life expectancy of rail equipment, exceeding 40 years in some cases.

This concept was conceived with a focus on 34" diameter tanks as the optimum sized for underframe CNG cylinders for locomotive applications. Once developed it is appropriate for other smaller and larger type 4 cylinders applications. These applications could be outside of the rail industry; example applications include marine, on road truck and bus, or off-road mining trucks.

In this embodiment is used a metal tank insert on each end of a Type 4 CNG cylinder. The pilot feature described could also be incorporated into a type 3 metal tank liner when it is formed. This would allow a Type 3 CNG cylinder the benefit of a longer tank and a flexible plate mounting system. In this case a separate valve body can be installed inside the perimeter of this pilot material. It would most likely be retained by bolts and sealed with an O-ring. On larger type 3 tanks, the threaded port hole could be opened up from the standard 1.125-12 thread to something larger. Into this threaded area a valve body could be threaded that does not have a protruding handle, a female socket or special male tool shape would be inserted to rotate and operate the shut off valve. As in the Type 4 tank configuration, it is intended that the valves and plumbing for the cylinder be recessed and protected from contact with collision damaged structure around the tank end.

The sixth portion of the summary relates to vertical Siamese LNG tank modules. In order to address the packaging opportunities corresponding to NG storage on hybrid tender cars or other natural gas fuel applications where storage footprint is limited, described here is an LNG tank module that can be configured to fit most any installation space and orientation using a Siamese construction for the inner pressure vessels.

The tank module is a fabricated a vertical two section siamese tank consisting of two cylindrical tanks cut longitudinally off center from the center axis and welded together on either side of a common plate. This LNG tank module design better fits the tender car profile which is 10 feet wide and 16 feet tall. With an even thinner tank system in the lateral direction this LNG module design will leave additional space on each side of it within the tender car.

The additional space on each side would address one problem with existing LNG tank cars used as locomotive fuel tenders, because the tank cars are so tall and wide, there is no way for a locomotive crew member to safely walk from one locomotive to another when a locomotive is connected to each end of the tender. Also this extra side clearance makes the LNG module and tender car more crashworthy with more rail car structure and additional space for that extra structure to deform during an accident.

A further advantage of the extra space on each side of the LNG tank module is its availability as ducting space for a potential ram air cooling system for the locomotives. The energy saved by allowing ram air cooling and waste heat recovery is like adding 15% more fuel storage capacity at the same time the fuel cost is reduced by 15%. Further, instead of the tender car taking up the space of a potential locomotive, it just created 30% of one locomotive in unused powered cooling fan power and recovered waste heat energy.

The seventh portion of the summary relates to a locomotive underframe Siamese LNG fuel storage system. An alternate embodiment on the Siamese LNG tank module construction addresses a remaining opportunity to maximize the fuel density for underframe storage on the locomotive. The larger distance between the trucks on passenger and freight locomotives allow sufficient length to mount tanks longitudinally under the locomotive frame instead of in a separate tender car. Since regulations and performance requirements for LNG tanks are different than for CNG cylinders, the structural, access and maintenance requirements are different as well. The LNG storage requirements lend themselves to expanding the Siamese tanks module into a multi cylinder tank enclosure. The cylinders become part of the enclosure structure to absorb and/or transfer loads allowing the enclosure to meet the crashworthiness requirements with a minimum of external structure added to do so. The Siamese enclosure is fabricated similarly to the Siamese tank module by orienting the cylinders horizontally and adding split plates and additional cylindrical shaped sections to create a single large LNG volume tank that spans the length and width of the underframe cavity on the locomotive.

By creating a single LNG pressure vessel with multiple cylindrical shaped sections sharing common walls, a conformal pressure vessel can be formed that maximizes the amount of pressurized liquid or gaseous fuel can be stored in a rectangular shaped area such as the 10 foot wide and 3 foot tall space under the locomotive. In the case of the locomotive underframe area, four 28" diameter tanks can be made with 3 shared walls to fit in the same space that only 3 independent tanks would for increased capacity.

Further this one pressure vessel instead of 3 independent vessels reduces the amount of shut off valves, plumbing pipes and fittings by two thirds; drastically reducing cost, complexity and failure points. This also greatly reduces the heat leak due to plumbing because there are only two penetrations through the vacuum insulation cavity instead of six. Heat leak is also reduced due to the shared walls and the fact that ratio of volume compared to surface area that can absorb radiated heat is increased by fifty percent or more compared to individual tanks The vertical shared walls also provide a good load path for the vertical crushing loads the tank must be able to withstand during a derailment. The vertical shared walls are further reinforced from bucking by having multiple internal tank baffles welded to them.

The use of movable support plates with the outer supports at opposing angles allows the inner siamese pressure vessel to be vertically and laterally supported and located by only 6 contact points. These mounts will also be the load path that takes the vertical crushing load from the bottom of the tank and transfer it through the shared siamese pressure vessel walls to the enclosure top surface and the lower surface of the locomotive frame.

The eighth portion of the summary relates to an LNG pump module. The Siamese LNG tank module and underframe Siamese LNG Enclosure module can be used in an existing passive LNG vaporizing system, but in order to fully realize the fuel density potential and ease of infrastructure adaption, the LNG pump module (LNGPM) should be included as well.

The LNG pump module concept is for a relatively small, self-contained fuel delivery system for use with LNG that can provide a moderate pressure rise of up to three hundred psi over a flow range of 0.2 to 4.0 GPM. The module's ideal operating temperature range is from −100 to −200 degree Celsius and it is scalable and adaptable to different applications to maximize the opportunities for natural gas fueled vehicle The LNG pump module (LNGPM) is an active system that does not rely on vaporization of the natural gas to generate the fuel system pressure or manage the remaining gas in the tank. Instead the module draws the LNG from the tank at a temperature and pressure much lower than that required to by the fuel system. The LNGPM then pressurizes the LNG to a required level and delivers it to the fuel system at a low temperature and high density. Maintaining and supplying the natural gas in a low temperature, high density state to the fuel management system provides several benefits. The system does not require the LNG vaporization to generate the fuel pressure; the LNG can be maintained at temperatures and pressures much lower than the vaporization point allowing both increased density and longer storage time in tank. Supplying the natural gas at an elevated pressure and low temperature also provides the benefit of defining where and at what pressure the natural gas vaporization occurs and addresses issues with pressure variations currently experienced in the NG vaporization and delivery systems downstream from the storage system The LNGPM is to be externally powered and controlled. The controller is software configurable and will provide the necessary voltage and frequency for variable speed and load operation based on sensor and system commands inputs. This will allow the LNG Pump Module to be quickly adapted to a specific application allowing the transfer of LNG from the tank(s) to the engines fuel management system on demand at the necessary flow and pressure.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 4A is an isometric exploded view of a Crashworthy Underframe LNG Storage System illustrating the assembly of the Siamese LNG pressure vessel into the Crashworthy Enclosure. The Siamese LNG pressure vessel would be slid into and supported inside the crashworthy enclosure on 6 movable supports and the end plate would then be welded to the enclosure completing the assembly FIG. 4B is a Detail View of FIG. 4A illustrating the LNG feed pipe and the vent pipe attachment to the Siamese LNG pressure vessel.

FIG. 4C is a Detail view of FIG. 4B illustrating movable support contact piece and its thermal insulating support where it rests upon the outer surface of the Siamese LNG pressure vessel FIG. 5A is a cross section view of the Crashworthy LNG Storage System illustrating the relationship between the Siamese LNG pressure vessel, the Crashworthy Enclosure and the 6 movable supports.

FIG. 5B is a Detail View of FIG. 5A illustrating in more detail the components and internal structure that support and locate the 6 movable supports.

FIG. 6A an isometric view illustrating the shared Siamese walls and the baffle plates that make up the internal support structure of the Siamese LNG tank.

FIG. 6B is a detail view of FIG. 6A and illustrates the direct load path of the angled movable support feature directly into the shared Siamese wall of the Siamese LNG pressure vessel.

FIG. 8 is a side view of a high capacity CNG tender car with a structural center bulkhead

FIG. 12A is a cross section view of a large type 4 CNG cylinder illustrating the recessed end cavity for protective installation of the pressure relief and shutoff valve.

FIG. 12B is a detail view of FIG. 12A further illustrating the plate and pilot mounting feature.

FIG. 13A is a side view of a locomotive illustrating a LNG storage system with an attached LNG pump module.

FIG. 13B is a detail view of FIG. 13A further detailing the LNG pump module components.

DETAILED DESCRIPTION OF THE INVENTION

To facilitate an understanding of the present disclosure, a number of terms and phrases are defined below:

Throughout this document, certain systems have been described for use with CNG, or LNG cylinders or vessels. It should be noted that these concepts would be usable for high pressure or cryogenic vessels containing any pressurized and/or liquefied gaseous fuel including hydrogen.

ISO Tank Module: Intermodal tank system with an ISO specified frame for stacking with other intermodal containers.

Figure 1:
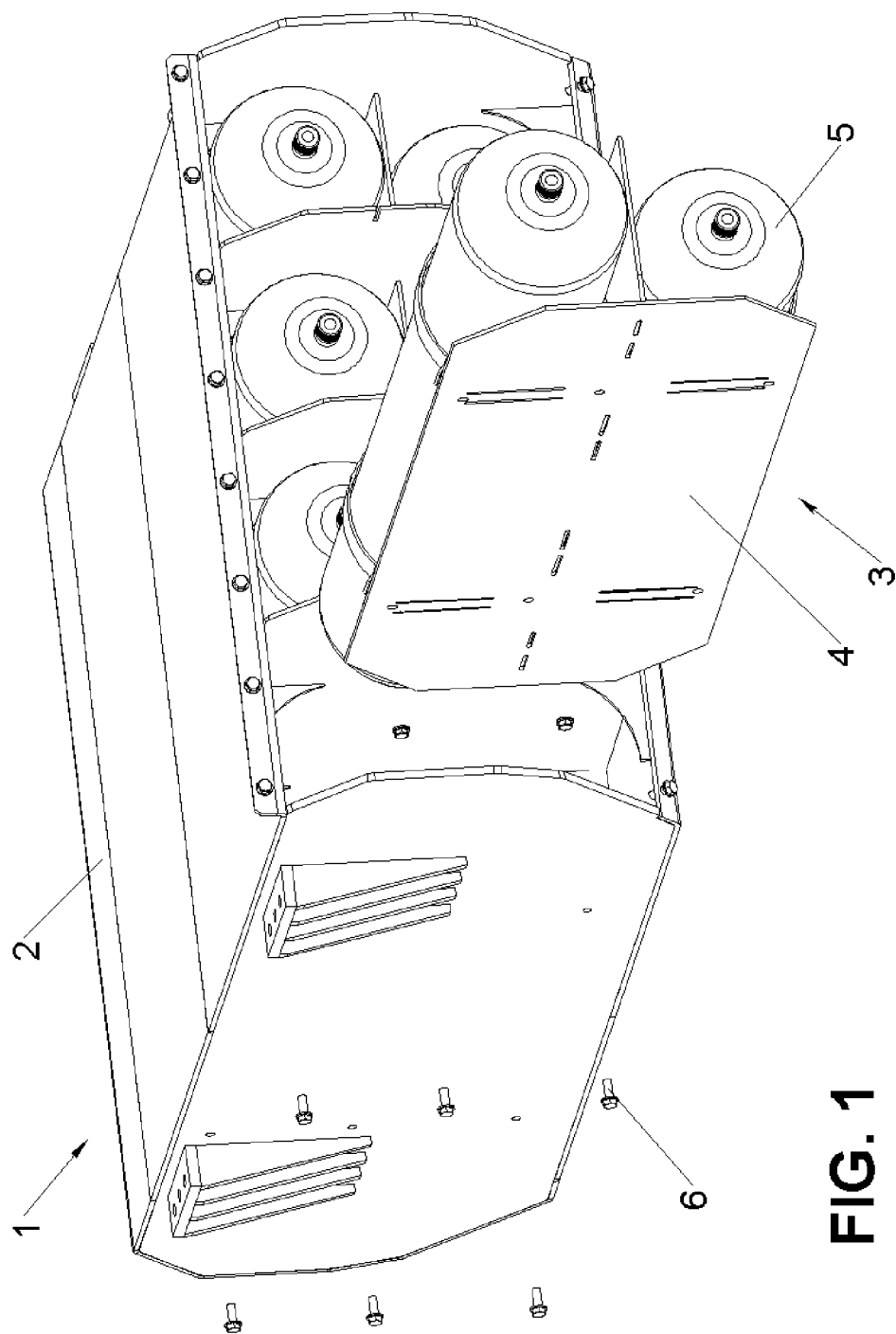
FIG. 1 is an isometric view of the Crashworthy Underframe CNG Storage System, containing four 2 cylinder tank modules illustrating the integration and packaging of the system for locomotive underframe mounted applications

The first portion of the detailed description relates to a locomotive underframe CNG fuel storage system. FIG. 1 illustrates a CNG storage system 1 that is composed of one Crashworthy Enclosure 2 and at least one CNG cylinder module 3. In this embodiment, CNG storage system 1 incorporates four CNG cylinder modules 3.

The second portion of the detailed description relates to a crashworthy enclosure. The Crashworthy Enclosure 2 is a semi monocoque structure configured in such a way as to withstand and/or distribute external loads allowing it to meet the structural and crashworthiness requirements while maintaining the integrity and maximizing the storage volume of the cylinders within it.

Because the CNG cylinder modules 3 have combined plumbing that can be accessed from one side, it allows the Crashworthy Enclosure 2 to have one removable side panel and one permanent side panel. This permanent side panel is welded in place and offers more structural rigidity than the removable side panel on the opposite side from it. This will either add strength or allow thinner and lighter materials to be used in the enclosure structure.

In FIG. 1 Crashworthy Enclosure 2 is shown with its removable door not present in order to illustrate removal of CNG cylinder module 3. As removable door panels are common in the art of enclosures no further discussion is needed.

FIG. 1 further illustrates the removal of CNG cylinder module 3. Also visible are six bolts 6 that are used to retain each CNG cylinder module 3 to the Crashworthy Enclosure 2. Less or more than six bolts 6 may be needed for CNG cylinder module 3 retention depending on the particular design.

Figure 2A:
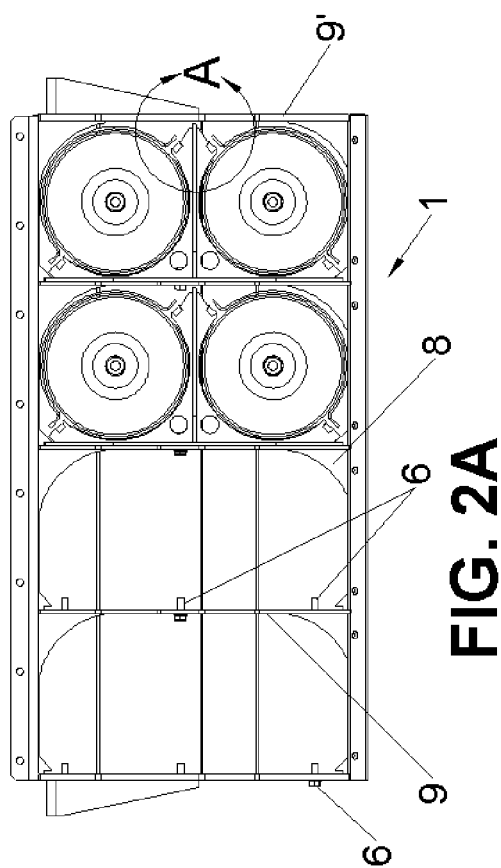
FIG. 2A is a side view of the Crashworthy Underframe CNG Storage System with 2 of the 4 CNG cylinder modules removed. This view illustrates the tall slender vertical walls and the vertical wall gussets that have to absorb the vertical crushing loads when a derailed locomotive would be resting on the bottom surface of the CNG enclosure.

FIG. 2A is a side view of the CNG storage system 1, again with the removable side panel missing from Crashworthy enclosure 2. In this view the 2 left CNG cylinder modules 3 are removed. Because this embodiment of crashworthy enclosure 2 can hold four CNG cylinder modules 3, there will be 3 thin vertical walls 9 and two outer thicker vertical walls 9'. Also visible are gussets 8 that help support the top and bottom of the thin vertical walls 9 by shortening their center span where the thin material can easily deflect and the thin vertical wall 9 can buckle allowing crashworthy enclosure 2 to collapse.

Each CNG cylinder module 3 will have its own set of six bolts 6. When bolts 6 are in place they offer additional stiffness to the thin vertical walls 9 to help prevent buckling This could allow the fixed vertical walls 9 to be made from thinner material.

Figure 2B:
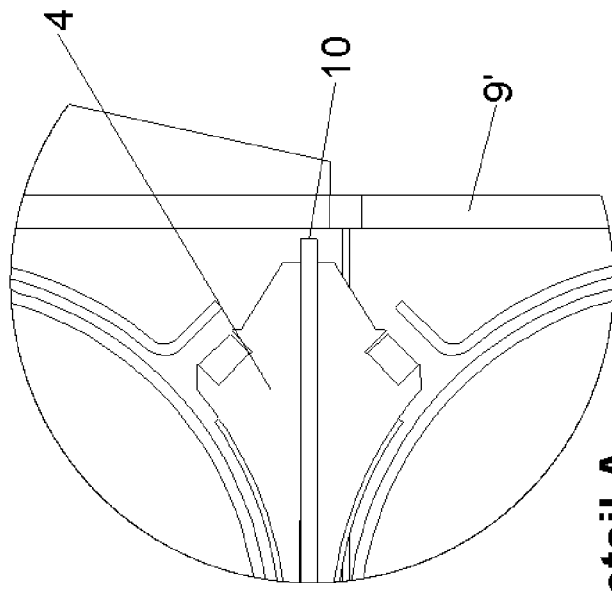
FIG. 2B is a detail view of FIG. 2A Illustrating the contact point where the CNG Module has a feature that helps to prevent the vertical wall from buckling under high crushing loads.

FIG. 2B is a detail view of FIG. 2A. It illustrates the anti-buckling contact point 10 where the horizontal plate of the CNG module frame 4 is in close proximity of the neighboring vertical wall, either thin vertical wall 9 or thicker vertical wall 9'. This helps to prevent any of the vertical walls from buckling by connecting them together along this plane formed by the CNG module rack 4 horizontal plates.

Figure 3:
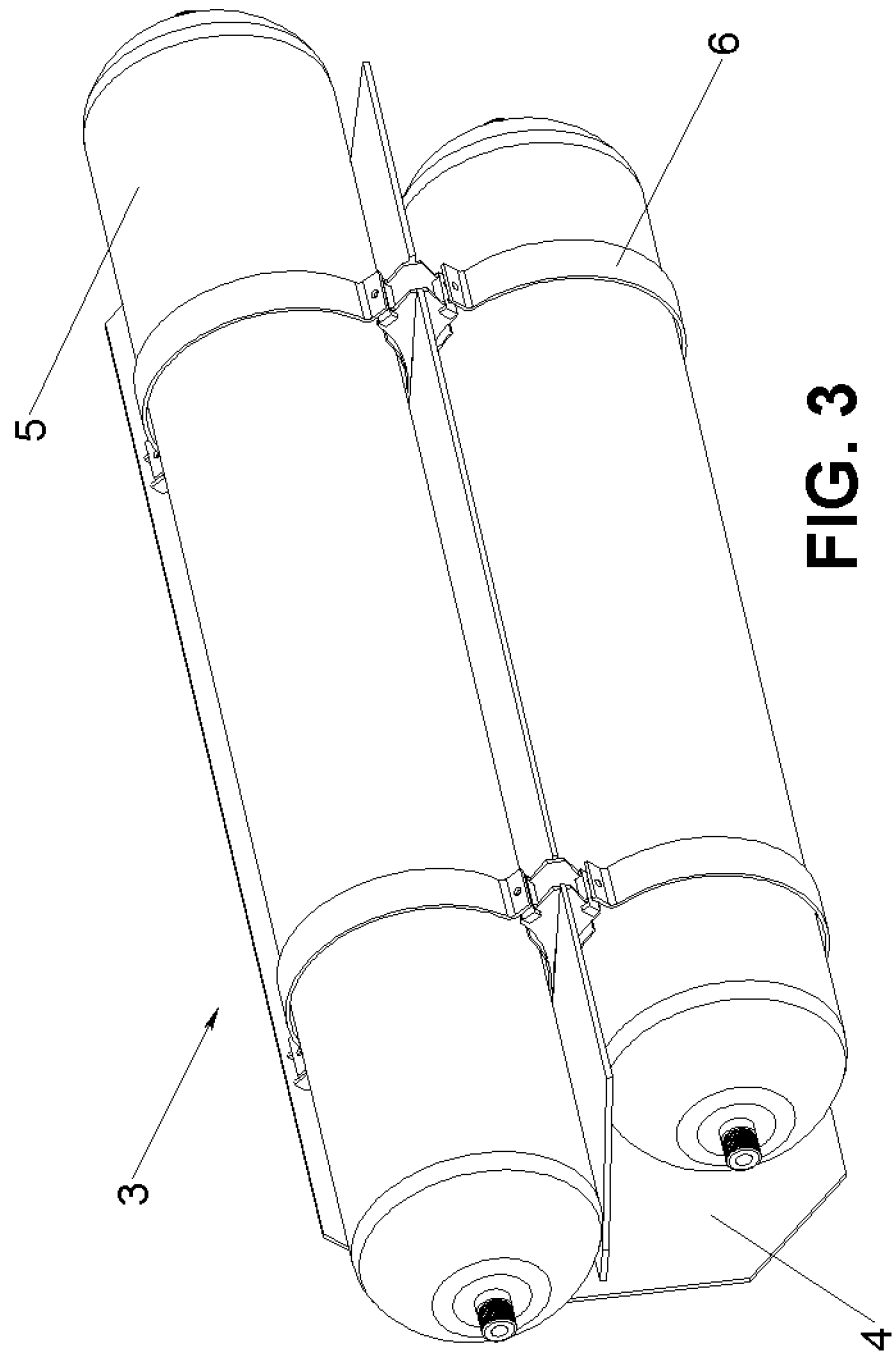
FIG. 3 is and isometric view of the CNG cylinder module illustrating the individual CNG cylinders and the straps that retain them to the CNG cylinder module frame.

The third portion of the detailed description relates to a CNG tank module. FIG. 3 Illustrates a CNG tank module 3 that contains two CNG cylinders 5 mounted to the module frame 4. Visible are the tank mounting straps 6 that are installed at a 45 degree angle for compactness. It is apparent that the fasteners required to attach straps 6 would be challenging to manipulate if the module frame 4 was permanently installed into crashworthy enclosure 2. In that case the spacing between thin vertical walls 9 would need to be several inches greater.

In this embodiment the CNG tank module 3 contains a pair of CNG cylinders 5. CNG tank module 3 can be composed of 1 or more CNG cylinders fixed to the module frame 4 in such a way as to make the CNG tank module 4 compatible with and mountable in a crashworthy enclosure.

The removable CNG tank module 3 has several advantages besides providing an efficient use of space while still allowing service access to the tanks:

The primary advantage is structural as the vertical stacking of the pair of 16" or 17" diameter CNG cylinders 5 allows a vertical structural wall 9 every 18" or so. These vertical walls of the frame allow the enclosure to withstand the crushing loads that the tank would suffer in a derailment without the larger vertical load passing through and possibly compromising the CNG cylinders 5.

The plumbing can be significantly simplified, as both CNG cylinders 5 in each CNG cylinder module 3 can be plumbed on the rack to one high pressure outlet fitting and one vent fitting. During a CNG cylinder module 3 installation and removal only the single pressure and vent line need to be connected or disconnected in the field.

Each pair of CNG cylinders 5 could be connected to a single PRD valve with a pair of temperature sensors on each rack.

The fourth portion of the detailed description relates to a locomotive underframe LNG fuel storage system. FIG. 4A illustrates a possible underframe locomotive LNG tank system that is crashworthy, simple and high capacity. In this design siamese pressure vessel 33 is slid into crashworthy enclosure 35 on six movable supports 34. After that end plate 32 is welded into place becoming an integral part of crashworthy enclosure 35. This creates a vacuum insulation cavity between the crashworthy enclosure 35 and siamese pressure vessel 33.

FIG. 4B is a detail view of FIG. 4A illustrating LNG feed pipe 41 and vent pipe 40 which are both welded to siamese pressure vessel 33. In this embodiment both of these are corrugated for flexibility. When end plate 32 is welded to crashworthy enclosure 35, end plate 35 is also welded to LNG feed pipe 41 and vent pipe 40. These two metallic pipes are the only non insulated direct heat path between the siamese pressure vessel 33 and the crashworthy enclosure 35. If the tank system had 3 independent tanks, there would be 6 of these heat paths instead of 2.

FIG. 4C is a detail view of FIG. 4B illustrating one of the 6 mounting points for the siamese pressure vessel 33. In direct contact with the surface of the pressure vessel 33 is an insulator block 42, and captured inside insulator block 42 is support pivot 43. Insulator block 42 is captured by locating features on siamese pressure vessel 33 and is made from some hard but insulating material such as resin impregnated phenolic cloth. Support pivot 43 will be subject to a concentrated load so it is likely to be made of a metallic material such as steel.

FIG. 5A is a cross section view of the tank assembly. Inside of siamese pressure vessel 33 are 3 shared vertical walls 36 and multiple baffle plates 38.

FIG. 5B is a detail view of FIG. 5A illustrating one of the six movable supports 33 and the components that locate and transmit load through it. Directly contacting each end of movable support 33 are support pivots 43. Capturing each support pivot 43 is an insulator block 42. This set of components is designed to transmit load with a minimal transfer of heat between the siamese pressure vessel 33 and crashworthy enclosure 35. There is a set above and below siamese pressure vessel 33. There are also four angled sets of these parts that not only transmit vertical force, but due to their opposing angles, they locate siamese pressure vessel 33 laterally inside of crashworthy enclosure 35.

The pressure induced stresses in siamese pressure vessel 33 are carried by arched plates 37 that make up the exposed surface of pressure vessel 33 and by the vertical plates 36 which are shared by the neighboring siamese pressure chambers. Due to geometric conditions inherent in pressure vessels shared, vertical wall 36 should be at least twice the thickness of arched plates 37. The vertical load paths created by movable supports 3 are transmitted to pressure vessel 33 and carried through the pressure vessel 33 by the shared vertical wall 36.

FIG. 6A is an isometric view of the internal structural components of siamese pressure vessel 33. This illustrates how multiple baffle plates 38 will help prevent the 3 shared vertical walls 36 from buckling when subject to the very high vertical loading forces during a derailment accident. This is when the locomotive has derailed and the locomotive fuel tank bottom is resting on a piece of track rail and supporting the weight of the locomotive.

FIG. 6B is a detail view of FIG. 6A illustrating how the vertical load path generated by an angled movable support is still transmitted directly through a vertical wall 36.

The fifth portion of the detailed description relates to vertical Siamese LNG tank modules. FIG. 7A is an isometric view of a siamese pressure vessel 51. There is a shared wall 54 in the middle of the two siamese cylindrical pressure vessels that form one pressure vessel cavity. Shared wall 54 will have holes in it that connect the two cylindrical pressure vessel shapes into one sealed pressure vessel cavity. Support pivot 55 runs along the bottom sides of siamese pressure vessel 51. Support pivot 55 may be made up of multiple components so that is can absorb a concentrated vertical load as it support the weight of the siamese pressure vessel 51 while transferring as little heat as possible.

Figure 7B:
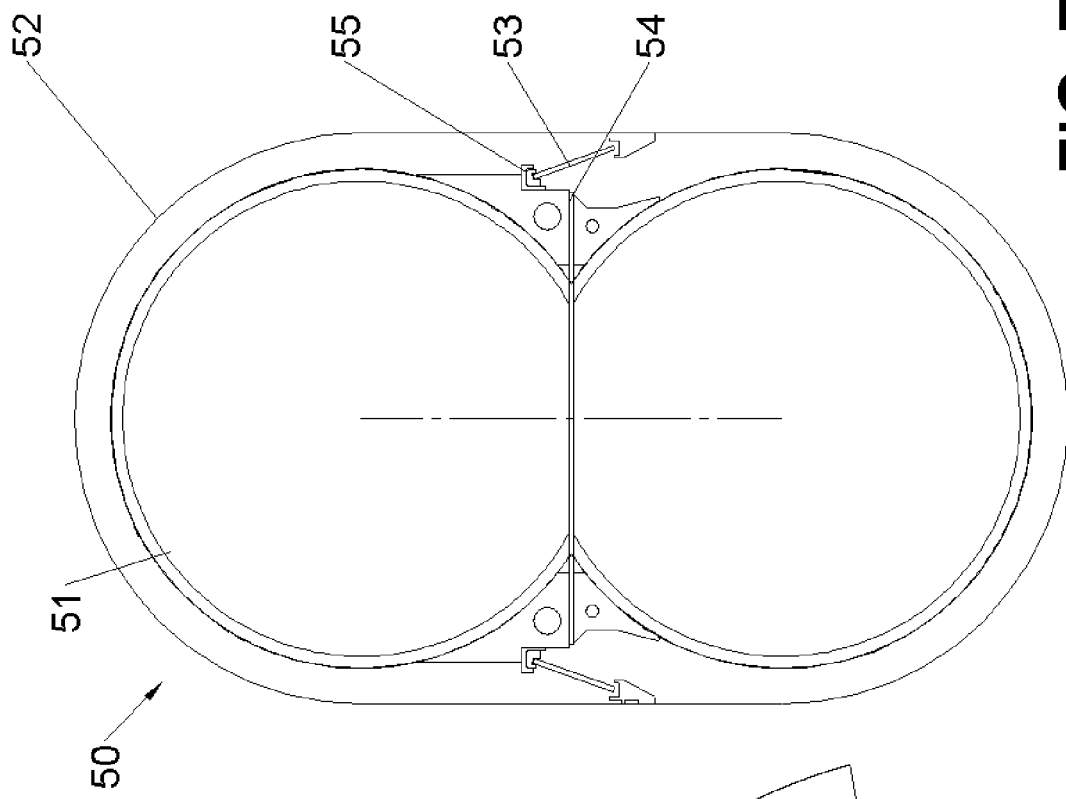
FIG. 7B is cross section view from the end of the Vertical Siamese LNG Tank Module illustrating the movable plate supports that vertically support the Siamese LNG pressure vessel inside.
Figure 7A:
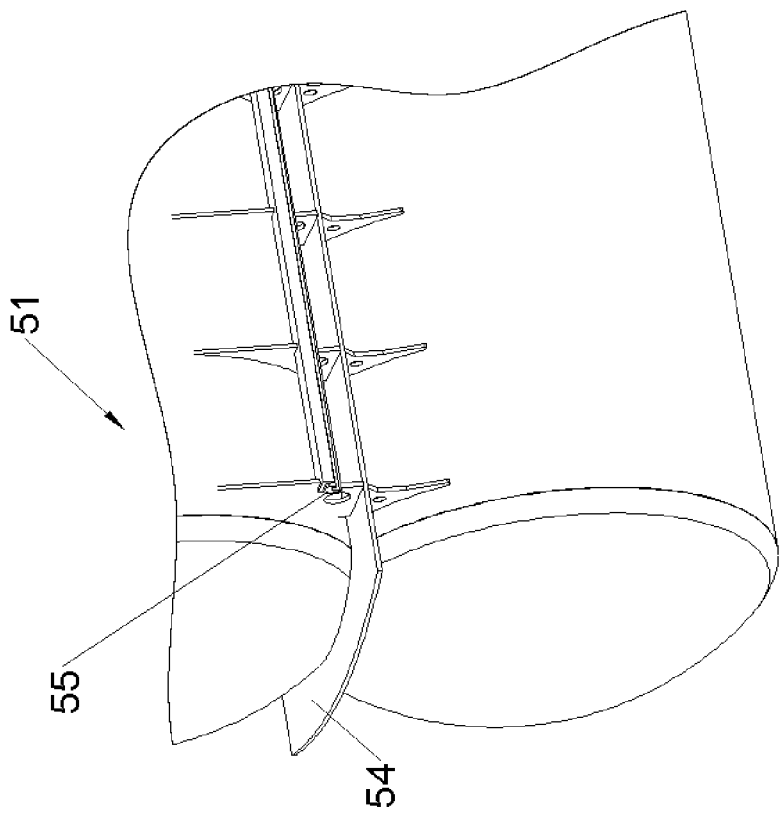
FIG. 7A is an isometric view illustrating the Siamese LNG pressure vessel and the support structure that interfaces with the movable support plate that vertically supports it.

FIG. 7B is an end view of the Vertical Siamese Tank Module 50. Shown are the main vertical supports 53 that vertically support the weight of the siamese pressure vessel 51. Around siamese pressure vessel 51 is the outer pressure vessel 52. In between siamese pressure vessel 51 and outer pressure vessel 52 is a vacuum cavity needed to keep the cryogenic LNG liquid from boiling off too rapidly.

Movable support 53 support contacts support pivot 55 and transfers the weight of siamese pressure vessel 51 to the outer pressure vessel 52 which is then attached to the rail vehicle that the Vertical Siamese Tank Module 50 is installed in. Not shown are other structural connections between the siamese pressure vessel 51 is the outer pressure vessel 52 that will absorb the axial and side loading on the tank and help the outer pressure vessel 52 maintain its shape. These supports will typically be placed in a direction normal to the outer pressure vessel 52 wall and will be much smaller in cross section and offer less of a heat leak potential. These standard lightly loaded supports are common in the art and not detailed here.

The sixth portion of the detailed description relates to a CNG tender car frame. FIG. 8 Illustrates a side view of CNG tender car 56. In this embodiment CNG Tender car 56 is built upon a rail car 57 with a structural bulkhead 58 in the middle. Rail car 57 is similar in construction to an intermodal well car in that it has long slender walls that maximize internal volume for installing cargo or equipment while providing the axial structure needed to transmit the axial coupling loads of a railcar in a train. Bulkhead 58 will connect the left and right walls together to stiffen the long slender side walls by cutting the effective length in half This adds significantly to the crashworthiness of the CNG tender car 56. For fuel storage crashworthiness, FRA regulations require that a locomotive fuel system be able to withstand a side impact from a class 8 truck.

Bulkhead 58 also supports one end of each CNG cylinder 59. In the preferred embodiment, each CNG cylinder 59 would have a fixed mount at bulkhead 58 and a sliding mount at the opposite end of the CNG cylinder 59. This sliding mount allows the CNG cylinder 59 to expand axially act as it is filled to a high pressure.

This embodiment of CNG tender car 56 contains twelve CNG cylinders 59. The upper 8 would be approximately 33 feet long and the lower four would be 25 feet long.

It would be possible to make these tender cars using Lincoln's standard 38 foot tanks replacing the 33 foot tanks in a longer rail car. Modern diesel electric locomotives have been produced up to 98 feet in length. This would add an additional 16% of fuel storage at a tender car length of approximately 85'.

Figure 9:
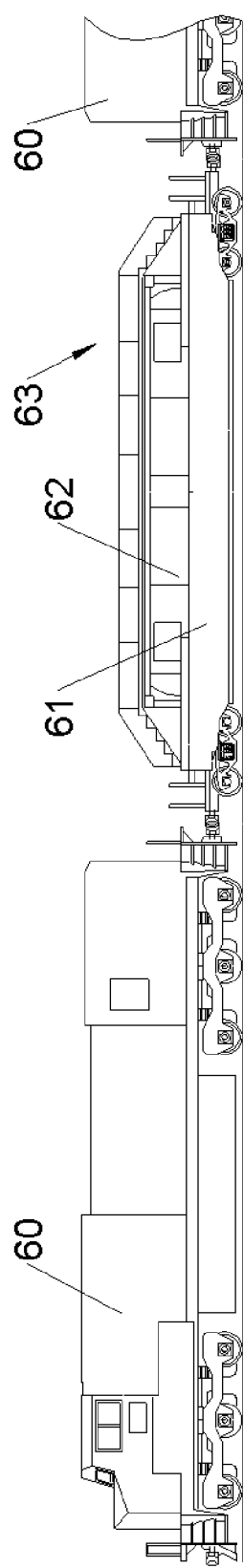
FIG. 9 is a side view illustrating a crashworthy LNG tender car built from a modified ISO intermodal cryogenic tank and intermodal well car.

With the larger diameter CNG cylinders designed for 4500 psi operating pressure, the tender car will be capable of storing 10,000 DGE of CNG fuel. This is only ⅔ of what an LNG rail car can carry, but is enough fuel to get two main line freight locomotives the distance they can now travel on their existing diesel tanks Currently the larger mainline diesel electric locomotives carry 5000 gallons of diesel fuel. As the railroad industry converts to natural gas over the next few years it will be using dual fuel locomotives that can only consume 50-70% natural gas so it would be capable of taking 3 or 4 locomotives the full distance on natural gas and would still have at least 30% of its diesel fuel remaining The seventh portion of the detailed description relates to an intermodal well car based LNG tender tank module. FIG. 9 illustrates a locomotive consist with two locomotives 60 connected to an LNG tender car 63 that is built from a conventional intermodal well car 61 with a modified intermodal tank module 62.

Figure 10:
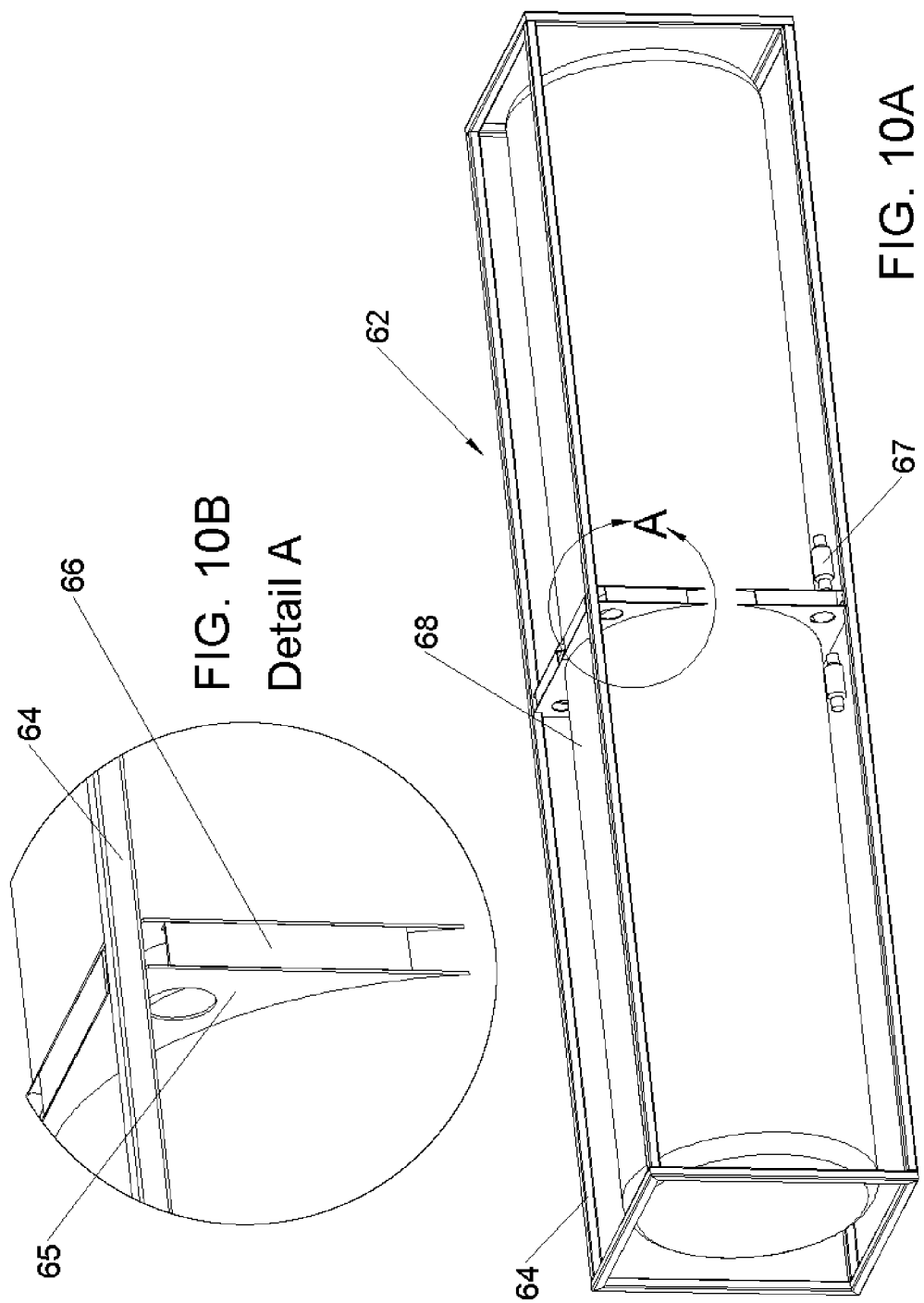
FIG. 10A is an isometric view illustrating the ISO LNG tank module with its structural improvements and optional LNG pump installation
FIG. 10B is a Detail view of FIG. 10A further detailing the minor structural improvements to the standard ISO Intermodal cryogenic tank

FIG. 10 illustrates an ISO intermodal tank container modified for LNG tender car service. ISO LNG module 62 is built from an ISO intermodal tank container and modified for crashworthiness by incorporating a structural feature that acts as a bulkhead. This structural feature connects the outer frame structure 64 to the outer pressure vessel shell 68.

With the structural bulkhead added. In this case there is only one bulkhead added at the center of the tank. In some cases there may be multiple bulkheads used to create even shorter zones for the side wall to resist buckling FIG. 10B illustrates a preferred embodiment of the structural bulkhead feature; it could be constructed from steel plates 65 and steel c-channel 66. These components would be welded to both the outer frame structure 64 and the steel outer pressure vessel 68. There are many different ways this bulkhead could be constructed, this is an economical and practical one.

Another embodiment is to add another metal hoop of steel around the tank that fits close to the outer pressure vessel shell 68. This second hoop may or may not be welded to the outside of the pressure vessel. The bulkhead could be welded to this hoop instead of the outer wall. In any case the outer wall of the pressure vessel is still acting as a structural element as it prevents the second hoop from collapsing.

It is the structural bulkhead feature utilizing the outer pressure vessel wall as part of its structure that makes this unique. This allows the structural bulkhead feature to act as a virtual solid wall without passing any of the potential side impact loads to the more critical inner pressure vessel that contains the hazardous LNG fuel.

Figure 11:
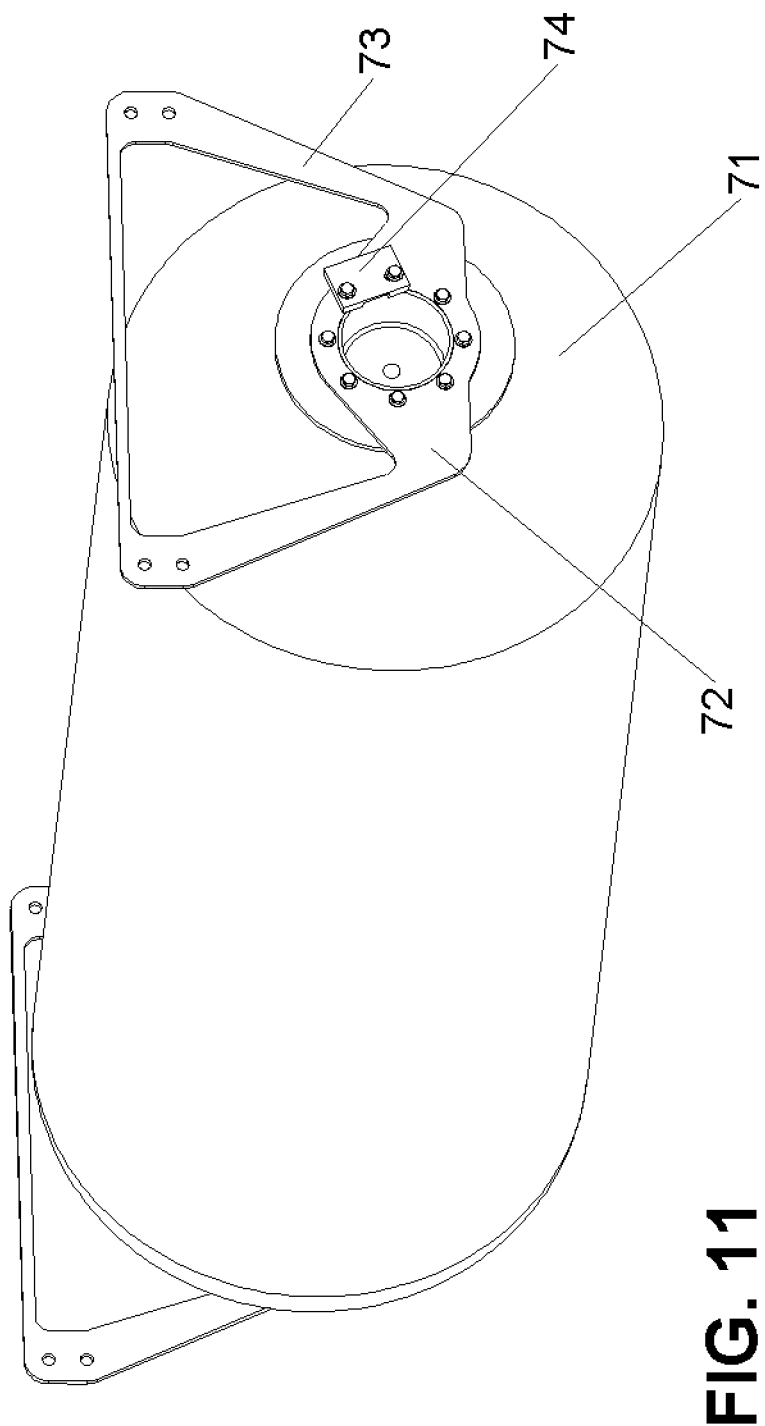
FIG. 11 is an isometric view of a large type 4 CNG cylinder with a recessed end cavity, pilot and plate mounting arrangement and a protective cover for the fuel line. A system which both increases safety and storage capacity.

The eighth portion of the detailed description relates to plate mounting of large type 4 CNG cylinders. FIG. 11 Illustrates a Type 4 CNG cylinder 71 with a mounting plate mount 72 at each end. The mounting plate 72 act as springs allowing the CNG cylinder 71 to expand and contract without the need for a sliding surface. The mounting plates 72 could have tapered spring arm sections 73 designed as depicted. These would offer the appropriate lateral stiffness needed to handle vehicle side loads, but would minimize the torque load applied to the CNG cylinder 71 metal tank insert when the mounting plates 72 flexed. The mounting plates 72 will have to flex when the tank grows in length during filling or contracts as it is emptied.

Also visible is a CNG fuel line protector 74.

With the tank pilot and mount plate design it is possible to minimize or eliminate the exposure of the CNG lines and valves past the end of the CNG cylinder and its mount structure. This embodiment of the CNG line protector will cover an exiting CNG line as it crosses the pilot at the end of the tank. Once it crosses this area is can be routed back behind the mounting plate so that it is protected from crushing and cutting by intrusion of material from past the tank in an incident. This CNG line protector could take many shapes including a complete cover of the recessed area for further protection.

FIG. 12A is a cross section of one end of the CNG cylinder 71 further illustrating the recessed area 75 for the valves and the low profile of the CNG fuel line protector 74. In this case the recessed area 75 is part of a CNG tank end fitting 76 and has a standard 1.125-12 threaded hole that would be machined into the boss of a standard CNG cylinder. CNG tank end fitting could also be redesigned so that a valve assembly could be bolted in with an o-ring. This valve assembly could be an on off valve that was electrically or air operated and would automatically shut off with a loss of power or pressurized air in a catastrophic event.

In FIG. 12A the CNG tank end fitting 76 is shown as a solid piece, it would most likely be cast or machined to have structural webbing making the part lighter and leaving more internal space for compressed gaseous fuel.

FIG. 12B is a Detail View of FIG. 12A illustrating how the cylinder pilot feature 77 is captured by the piloting hole in mounting plate 72, and the two components are held together by bolts 78. This direct bolting arrangement solves another mounting issue that strap mounting systems can suffer from. Each time a strap mounted CNG cylinder expands and contracts slightly during a fill and empty cycle, it can pivot slightly in its mounts. As rail equipment stays in service for many decades, this possible pivoting of tanks over time that can't be seen inside of a protective enclosure could be a problem. Pivoted far enough it could pinch or rupture a CNG fuel line.

The ninth portion of the detailed description relates to an LNG pump module. FIG. 13A a locomotive 85 is shown fitted with LNG tank assembly 86 and the LNGPM 87. The LNGPM 87 can be mounted directly to the LNG tank as shown or mounted remotely in applications where necessary to do so.

In FIG. 13B the LNGPM 87 is shown connected to the LNG pressure vessel 88 through the fill port 93 and the vent port 89. The fill port 93 connects to the LNGPM 87 at the pump manifold 92; LNG is then pumped from the pump manifold into the riser tube 91 that is contained within a vacuum sealed pressure vessel 90.

Figure 14:
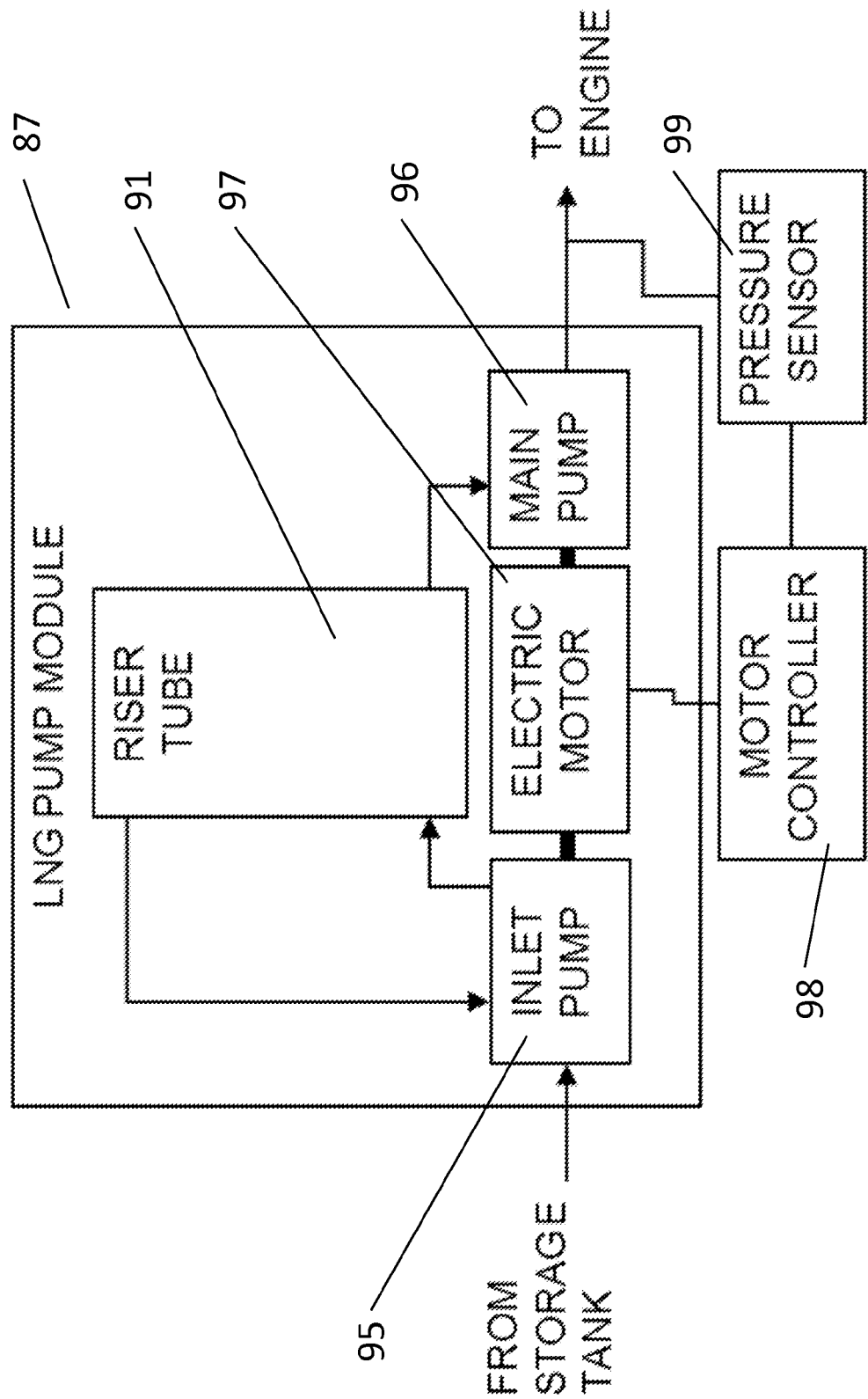
FIG. 14 is a block diagram of the LNG pump module system

FIG. 14 illustrates a functional block diagram of the preferred embodiment of the LNGPM 87. With the possible exception of the sensors 99 and controller 98, these components are built into a compact, insulated "module" that can be mounted locally or remotely making it easily integrated into various mobile applications. The pump manifold 92 can serve as the primary structure of the LNGPM 87 and can contain the motor 97, inlet pump 95 and main pump 96. The inlet and mounting interface on the pump manifold 92 can be the side face of the side face of the pump manifold 92 allowing it to be mounted near or directly to the end of an LNG storage tank. The top surface of the manifold can have the necessary provisions to house the riser tube 91 inside a vacuum insulated sealed pressure vessel 90. The pressure vessel 90 will contain the output port and vent port interfaces necessary to attach and interface with vent port 89 and the locomotive 85 fuel system.

The pump manifold 92 can contain an the electric motor 98 which in this embodiment is to be a "wet" electric motor sealed within the pump manifold 92 to avoid the need for mechanical seals that present reliability issues. The motor 98 can be sized and configured within the pump manifold 92 such that it may drive the main pump sufficiently to generate the necessary flow and pressure. An inlet pump 95 can be included to address low inlet pressure conditions and serve to prime the main pump 96 by filling the riser tube 91 within the pressure vessel 90 above the pump manifold 92. The bearings for the motor 97 will be selected based on the load, temperature and lubrication conditions. The two pump stages can be positive displacement type (gerotor or gear) as the flow and pressure of the pumps is directly proportional to the speed and torque applied to the inlet pump 95 and main pump 96 through direct or indirect interface with the shaft of the motor 97.

Control and monitoring of the LNGPM output flow and pressure is to be managed via external interface with the controller 98. Controller 98 can be software configurable to allow the pump to provide user defined LNG flow and pressure over its operating range by varying the motor 97 speed.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A locomotive underframe CNG fuel storage system comprising:
    an enclosure including a removable side panel and a permanent side panel welded into place; and
    at least one CNG cylinder module, wherein each CNG cylinder module includes at least one CNG cylinder secured to a first vertical wall, wherein, in an initial condition, the at least one CNG cylinder does not contact a second vertical wall, further wherein, in a second condition in which vertical axial weight causes the second vertical wall to deflect towards the CNG cylinder, the CNG cylinder prevents the second vertical wall from moving further out of plane.

2. The locomotive underframe CNG fuel storage system of claim 1 wherein in the second condition in which vertical axial weight causes the second vertical wall to deflect towards the CNG cylinder, the CNG cylinder contacts one or more gussets attached to the second vertical wall and prevents the second vertical wall from moving further out of plane.

3. The locomotive underframe CNG fuel storage system of claim 1 wherein in the second condition in which vertical axial weight causes the second vertical wall to deflect towards the CNG cylinder, the CNG cylinder contacts the second vertical wall and prevents the second vertical wall from moving further out of plane.

4. A CNG tender car including:
    a pair of axial walls, each axial wall including a length that spans from a front of the tender car to a back of the tender car;
    a structural bulkhead connecting the pair of axial walls at a midpoint such that the tender car has the strength to withstand a side impact from a class 8 truck, wherein the bulkhead divides an internal space of the tender car into a front portion and a back portion and divides the lengths of each axial wall into a front length and a back length, wherein neither the front length or the back length is greater than half the length of its axial wall;
    a plurality of CNG cylinders, wherein a first end of each CNG cylinder is mounted to the bulkhead by a fixed position mount and a second end of each CNG cylinder includes a mounting plate mount that moves axially, wherein at least one CNG cylinder is located in the front portion and at least one CNG cylinder is located in the back portion.

5. The CNG tender car of claim 4 wherein the mounting plate mount includes a flexible plate mount.

6. The CNG tender car of claim 4 wherein the mounting plate mount includes a sliding surface.

7. The CNG tender car of claim 4 wherein the structural bulkhead and the fixed position mount are configured to support an axial crash loading of 6G.

8. A locomotive underframe cylinder fuel storage system comprising:
    an enclosure including an upper surface, a lower surface, vertical side walls, a plurality of fixed spaced vertical walls parallel to the vertical side walls, and a plurality of upper and lower gussets, wherein an upper gusset and a lower gusset secure an upper end and a lower end, respectively, of each vertical wall to the upper and lower surfaces, respectively; and
    a plurality of cylinder modules, each module including a vertical plate that is positioned within the enclosure adjacent to one of the vertical side surfaces and the plurality of vertical fixed walls and receiving a cylinder;
    wherein a loading applied to the upper surface of the enclosure causes deflection of the plurality of vertical fixed walls such that the cylinder of each module prevents the buckling of the adjacent vertical fixed wall.

9. The locomotive underframe cylinder fuel storage system of claim 8 wherein if no loading is applied to the upper surface of the enclosure, the cylinder of each module is spaced from the adjacent upper and lower gussets.

10. The locomotive underframe cylinder fuel storage system of claim 8 wherein each cylinder module receives a single cylinder.

11. The locomotive underframe cylinder fuel storage system of claim 8 wherein each cylinder module includes at least one tank mounting strap that secures the cylinder to the cylinder module.

12. The locomotive underframe cylinder fuel storage system of claim 8 wherein a loading applied to the upper surface of the enclosure causes deflection of the plurality of vertical fixed walls such that the cylinder of each module contacts the adjacent upper and lower gussets and prevents the buckling of the adjacent vertical fixed wall.

13. The locomotive underframe cylinder fuel storage system of claim 8 wherein a loading applied to the upper surface of the enclosure causes deformation of the plurality of vertical fixed walls such that the cylinder of each module contacts the adjacent vertical fixed wall and prevents the buckling of the adjacent vertical fixed wall.

* * * * *